United States Patent
Mercer

(10) Patent No.: US 10,338,284 B2
(45) Date of Patent: Jul. 2, 2019

(54) OPTICAL OBJECTIVE WITH ENLARGEMENT OF THE EXIT PUPIL BY MEANS OF A DIFFRACTIVE ELEMENT WITH A LENTICULE COMPRISING AN IRREGULAR FEATURE

(71) Applicant: VISION ENGINEERING LIMITED, Surrey (GB)

(72) Inventor: Graham Peter Francis Mercer, Hampshire (GB)

(73) Assignee: VISION ENGINEERING LIMITED, Surrey (GB)

( * ) Notice: Subject to any disclaimer, the term of this patent is extended or adjusted under 35 U.S.C. 154(b) by 338 days.

(21) Appl. No.: 14/435,364

(22) PCT Filed: Apr. 12, 2013

(86) PCT No.: PCT/EP2013/057679
§ 371 (c)(1),
(2) Date: Apr. 13, 2015

(87) PCT Pub. No.: WO2014/056631
PCT Pub. Date: Apr. 17, 2014

(65) Prior Publication Data
US 2015/0234101 A1    Aug. 20, 2015

(30) Foreign Application Priority Data
Oct. 12, 2012  (EP) ..................... 12250162

(51) Int. Cl.
*G02B 5/18* (2006.01)
*G02B 27/00* (2006.01)
*G02B 21/00* (2006.01)

(52) U.S. Cl.
CPC ......... *G02B 5/1842* (2013.01); *G02B 5/1852* (2013.01); *G02B 21/00* (2013.01); *G02B 27/0081* (2013.01)

(58) Field of Classification Search
CPC ........ G02B 21/14; G02B 21/16; G02B 21/18; G02B 21/06; G02B 27/0081;
(Continued)

(56) References Cited

U.S. PATENT DOCUMENTS 2,418,345 A * 4/1947 Grimson ............... G03C 7/00
352/44
4,993,790 A    2/1991 Vick
(Continued)

FOREIGN PATENT DOCUMENTS

CN    101 434 176 A    5/2009
JP    07/509326 A    10/1995
(Continued)

OTHER PUBLICATIONS

International Search Report for corresponding patent application No. PCT/EP2013/057679 dated Jun. 28, 2013.

*Primary Examiner* — William R Alexander
*Assistant Examiner* — Henry A Duong
(74) *Attorney, Agent, or Firm* — Renner, Otto, Boisselle & Sklar, LLP

(57) ABSTRACT

An optical instrument for producing an optical image to be viewed by an observer, the optical instrument comprising: an optical system for producing an optical image of an object which is viewable by an observer at an exit pupil; and a diffractive element located at an image plane of the optical system for producing an array of the exit pupils, which are perceivable as a single, enlarged exit pupil by the observer; wherein the diffractive element comprises a surface which has an array of diffractive units, each of which generates one
(Continued)

of the exit pupils of the array of exit pupils, the diffractive units each comprising a lenticule, which is effective to produce diffractive interference of light and generate a plurality of exit pupils which are displaced relative to one another in the form of an array of exit pupils, the lenticules each comprising an irregular feature having a plurality of surfaces; wherein the diffractive units are disposed progressively radially outwardly from the optical axis of the diffractive element and configured progressively to provide for an increasing angular offset, such that, independent of location on the aperture of the diffractive element, light from the received image is relayed to a common region on a viewing plane across the aperture of the diffractive element.

21 Claims, 5 Drawing Sheets

(58) Field of Classification Search
CPC .. G02B 5/1819; G02B 21/00; G02B 27/4205; G02B 5/1842; G02B 5/1852; G02B 21/0008; G02B 21/24; G01N 21/6458; G01B 9/04
USPC .......................................................... 359/368
See application file for complete search history.

(56) References Cited

U.S. PATENT DOCUMENTS

| | | | | |
|---|---|---|---|---|
| RE35,534 E | * | 6/1997 | Claytor | G02B 3/08 359/708 |
| 5,699,190 A | * | 12/1997 | Young | G02B 3/0025 359/619 |
| 6,028,704 A | * | 2/2000 | Freeman | G02B 27/0081 359/362 |
| 6,608,720 B1 | | 8/2003 | Freeman | |
| 7,123,415 B2 | * | 10/2006 | Mercer | G02B 5/18 345/8 |
| 2005/0237615 A1 | * | 10/2005 | Urey | G02B 3/0062 359/566 |

FOREIGN PATENT DOCUMENTS

| | | |
|---|---|---|
| JP | 11/014812 A | 1/1999 |
| JP | 2003/272424 A | 9/2003 |
| JP | 2009/204952 A | 9/2009 |
| WO | 1994/027177 | 11/1994 |
| WO | 1997/035223 | 9/1997 |

* cited by examiner

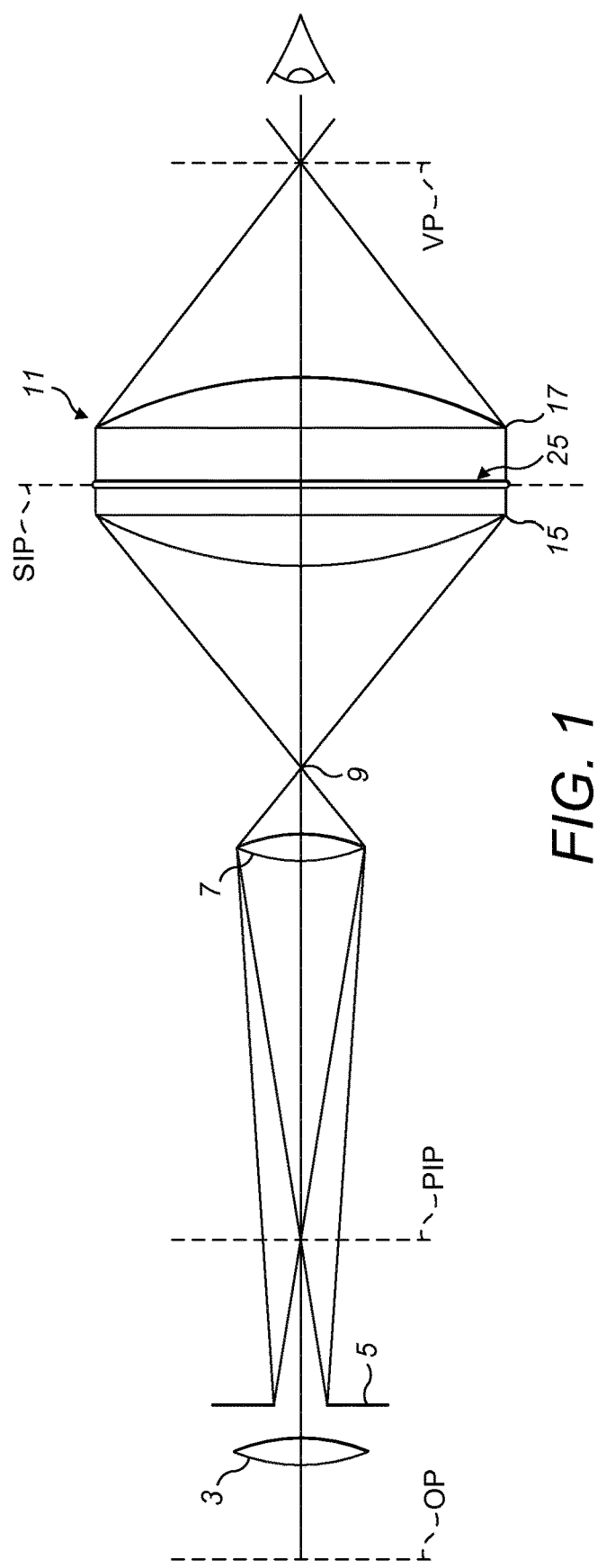

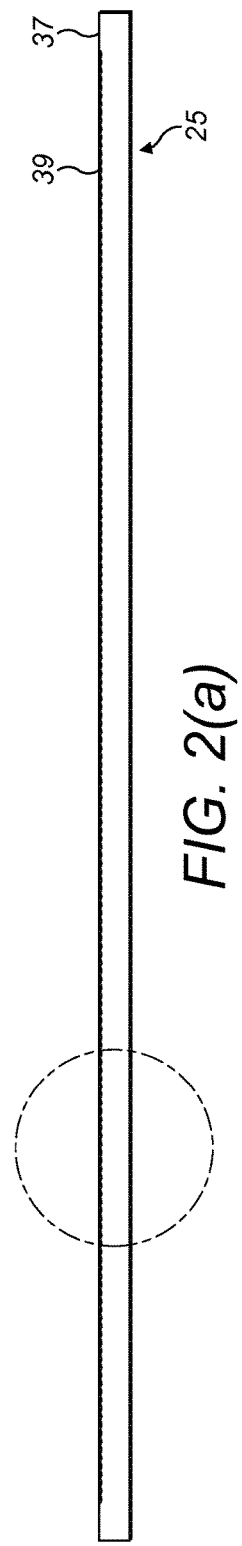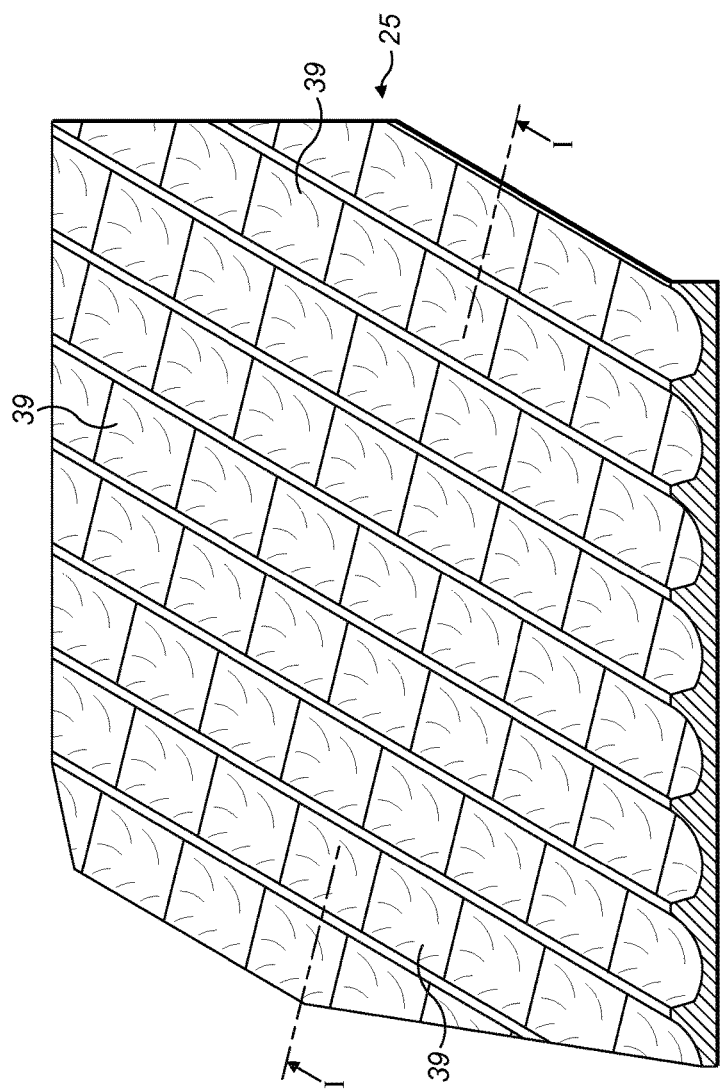

US 10,338,284 B2

OPTICAL OBJECTIVE WITH ENLARGEMENT OF THE EXIT PUPIL BY MEANS OF A DIFFRACTIVE ELEMENT WITH A LENTICULE COMPRISING AN IRREGULAR FEATURE

This application is a national phase of International Application No. PCT/EP2013/057679 filed Apr. 12, 2013 and published in the English language.

BACKGROUND OF THE INVENTION

Field of the Invention

The present invention relates to optical instruments, especially microscopes, in particular optical instruments which have an exit pupil at which an image of an object may be viewed by an observer, and diffractive optical elements for use with the same.

Description of Related Art

In conventional optical instruments, the size of the exit pupil is determined by a function of the numerical aperture and overall magnification of the optical instrument, and hence the size of the exit pupil is of fixed and relatively-small dimension. Consequently, it is necessary for an observer to accurately align the entrance pupil of his/her eye with the exit pupil of the optical instrument in order properly to view an image.

The present applicant has previously developed a number of different optical instruments which, through the provision of a diffractive element at an intermediate image plane, provide an exit pupil which is effectively enlarged, allowing an observer to view an image by placing his/her eye anywhere within the enlarged exit pupil. These optical instruments are disclosed in U.S. Pat. Nos. 6,028,704, 6,608,720 and 7,123,415.

U.S. Pat. No. 2,418,345 discloses the use of a diffraction grating in the coloration of a black and white photographic image.

The present applicant has now developed improved optical instruments, which still provide an exit pupil which is effectively enlarged, but which can provide for greater optical clarity and avoid the need for a field lens arrangement, which, given the size of the field of view, usually represents the most expensive component within the optical instruments, being a precision-ground and polished glass component.

BRIEF SUMMARY OF THE INVENTION

In one aspect the present invention provides an optical instrument for producing an optical image to be viewed by an observer, the optical instrument comprising: an optical system for producing an optical image of an object which is viewable by an observer at an exit pupil; and a diffractive element located at an image plane of the optical system for producing an array of the exit pupils, which are perceivable as a single, enlarged exit pupil by the observer; wherein the diffractive element comprises a surface which has an array of diffractive units, each of which generates one of the exit pupils of the array of exit pupils, the diffractive units each comprising a lenticule, which is effective to produce diffractive interference of light and generate a plurality of exit pupils which are displaced relative to one another in the form of an array of exit pupils, the lenticules each comprising an irregular feature having a plurality of surfaces; wherein the diffractive units are disposed progressively radially outwardly from the optical axis of the diffractive element and configured progressively to provide for an increasing angular offset, such that, independent of location on the aperture of the diffractive element, light from the received image is relayed to a common region on a viewing plane across the aperture of the diffractive element.

In another aspect the present invention provides an optical instrument for producing an optical image to be viewed by an observer, the optical instrument comprising: an optical system for producing an optical image of an object which is viewable by an observer at an exit pupil; and a diffractive element located at an image plane of the optical system for producing an array of the exit pupils, which are perceivable as a single, enlarged exit pupil by the observer; wherein the diffractive element comprises a surface which has an array of diffractive units, each of which generates one of the exit pupils of the array of exit pupils, the diffractive units each comprising a lenticule, which is effective to produce diffractive interference of light and generate a plurality of exit pupils which are displaced relative to one another in the form of an array of exit pupils, the lenticules each comprising an irregular feature having a plurality of surfaces.

In one embodiment the diffractive element is configured to relay light from the received image to a common region on a viewing plane across the aperture of the diffractive element.

In one embodiment the diffractive units are disposed progressively radially outwardly from the optical axis of the diffractive element and configured progressively to provide for an increasing angular offset, such that, independent of location on the aperture of the diffractive element, light from the received image is relayed to the common region on the viewing plane.

In one embodiment the diffractive units provide for relaying of light from the received image to the common region on the viewing plane without any relay lens arrangement.

In one embodiment the lenticules are formed on a radial spiral, optionally the lenticules are formed on a radial spiral at a radial spiral pitch of from about 40 µm to about 120 µm or from about 70 µm to about 100 µm and/or the pitch along the spiral is from about 40 µm to about 120 µm or from about 70 µm to about 100 µm.

In a further aspect the present invention provides an optical instrument for producing an optical image to be viewed by an observer, the optical instrument comprising: an optical system for producing an optical image of an object which is viewable by an observer at an exit pupil; and a diffractive element located at an image plane of the optical system for producing an array of the exit pupils, which are perceivable as a single, enlarged exit pupil by the observer; wherein the diffractive element comprises a surface which has an array of diffractive units, each of which generates one of the exit pupils of the array of exit pupils, the diffractive units each comprising a lenticule, which is effective to produce diffractive interference of light and generate a plurality of exit pupils which are displaced relative to one another in the form of an array of exit pupils, the lenticules each comprising an irregular feature having a plurality of surfaces and being formed on a radial spiral.

In one embodiment the radial spiral has a pitch of from about 40 µm to about 120 µm or from about 70 µm to about 100 µm and/or the pitch along the spiral is from about 40 µm to about 120 µm or from about 70 µm to about 100 µm.

In one embodiment the diffractive element is configured to relay light from the received image to a common region on a viewing plane across the aperture of the diffractive element.

In one embodiment the diffractive units are disposed progressively radially outwardly from the optical axis of the diffractive element and configured progressively to provide for an increasing angular offset, such that, independent of location on the aperture of the diffractive element, light from the received image is relayed to the common region on the viewing plane.

In one embodiment the diffractive units provide for relaying of light from the received image to the common region on the viewing plane without any relay lens arrangement.

In one embodiment the lenticules each include a rectilinear lenticule surface which defines a lateral face and is tilted or inclined relative to the surface of the diffractive element, optionally the lateral face encloses an angle of from about 65 degrees to about 90 degrees or from about 75 degrees to about 90 degrees relative to the surface of the diffractive element.

In a still further aspect the present invention provides an optical instrument for producing an optical image to be viewed by an observer, the optical instrument comprising: an optical system for producing an optical image of an object which is viewable by an observer at an exit pupil; and a diffractive element located at an image plane of the optical system for producing an array of the exit pupils, which are perceivable as a single, enlarged exit pupil by the observer; wherein the diffractive element comprises a surface which has an array of diffractive units, each of which generates one of the exit pupils of the array of exit pupils, the diffractive units each comprising a lenticule, which is effective to produce diffractive interference of light and generate a plurality of exit pupils which are displaced relative to one another in the form of an array of exit pupils, the lenticules each comprising an irregular feature having a plurality of surfaces and each including a rectilinear lenticule surface which defines a lateral face and is tilted or inclined relative to the surface of the diffractive element.

In one embodiment the diffractive element is configured to relay light from the received image to a common region on a viewing plane across the aperture of the diffractive element.

In one embodiment the diffractive units are disposed progressively radially outwardly from the optical axis of the diffractive element and configured progressively to provide for an increasing angular offset, such that, independent of location on the aperture of the diffractive element, light from the received image is relayed to the common region on the viewing plane.

In one embodiment the diffractive units provide for relaying of light from the received image to the common region on the viewing plane without any relay lens arrangement.

In one embodiment the lenticules are formed on a radial spiral, optionally the lenticules are formed on a radial spiral at a radial spiral pitch of from about 40 μm to about 120 μm or from about 70 μm to about 100 μm and/or the pitch along the spiral is from about 40 μm to about 120 μm or from about 70 μm to about 100 μm.

In one embodiment the lateral face encloses an angle of from about 65 degrees to about 90 degrees or from about 75 degrees to about 90 degrees relative to the surface of the diffractive element.

In one embodiment the lateral face is an arcuate or curved surface, optionally the lateral face is a frusto-cylindrical or frusto-conical surface, optionally the lateral face is an outwardly-curved surface or an inwardly-curved surface.

In one embodiment the lenticules each include a curved lenticule surface which extends from the rectilinear lenticule surface to the surface of the diffractive element, optionally the curved lenticule surface is a concave surface or a convex surface, optionally the curved lenticule surface has a radius of from about 0.5 mm to about 5 mm, from about 0.5 mm to about 2 mm or from about 0.5 mm to about 1.5 mm.

In one embodiment the lenticules are formed by a cutting tool, optionally the cutting tool comprises a frusto-spherical tip, having a flat part which cuts a rectilinear lenticule surface of each of the lenticules and a spherical part which cuts a spherical radius of the curved lenticule surface of each of the lenticules.

In one embodiment the spherical part has a radius of from about 0.5 mm to about 5 mm, from about 0.5 mm to about 2 mm or from about 0.5 mm to about 1.5 mm.

In one embodiment the progressively-increasing angular offset is provided by forming the lenticules of the diffractive units with increasing angular orientation relative to the optical axis of the diffractive element.

In one embodiment the lenticules are formed by inclining a cutting tool with increasing angular orientation relative to the optical axis of the diffractive element as the lenticules are formed progressively radially outwardly from the optical axis of the diffractive element.

In one embodiment the lenticules have a width of from about 30 μm to about 100 μm or from about 40 μm to about 70 μm.

In one embodiment the lenticules have a length of from about 30 μm to about 100 μm or from about 50 μm to about 90 μm.

In one embodiment the lenticules have substantially a rectangular shape at the surface of the diffractive element.

In one embodiment the surface of the diffractive element is on a substantially flat plane.

In one embodiment the optical instrument is a microscope.

BRIEF DESCRIPTION OF THE SEVERAL VIEWS OF THE DRAWINGS

Preferred embodiments of the present invention will now be described hereinbelow by way of example only with reference to the accompanying drawings, in which:

FIG. 1 illustrates an optical instrument in accordance with a first embodiment of the present invention;

FIG. 2(a) illustrates an elevational view of a diffractive element in accordance with one embodiment of the optical instrument of FIG. 1;

FIG. 2(b) illustrates a fragmentary perspective view of the diffractive element of FIG. 2(a);

DETAILED DESCRIPTION OF THE INVENTION

Figure 2C:
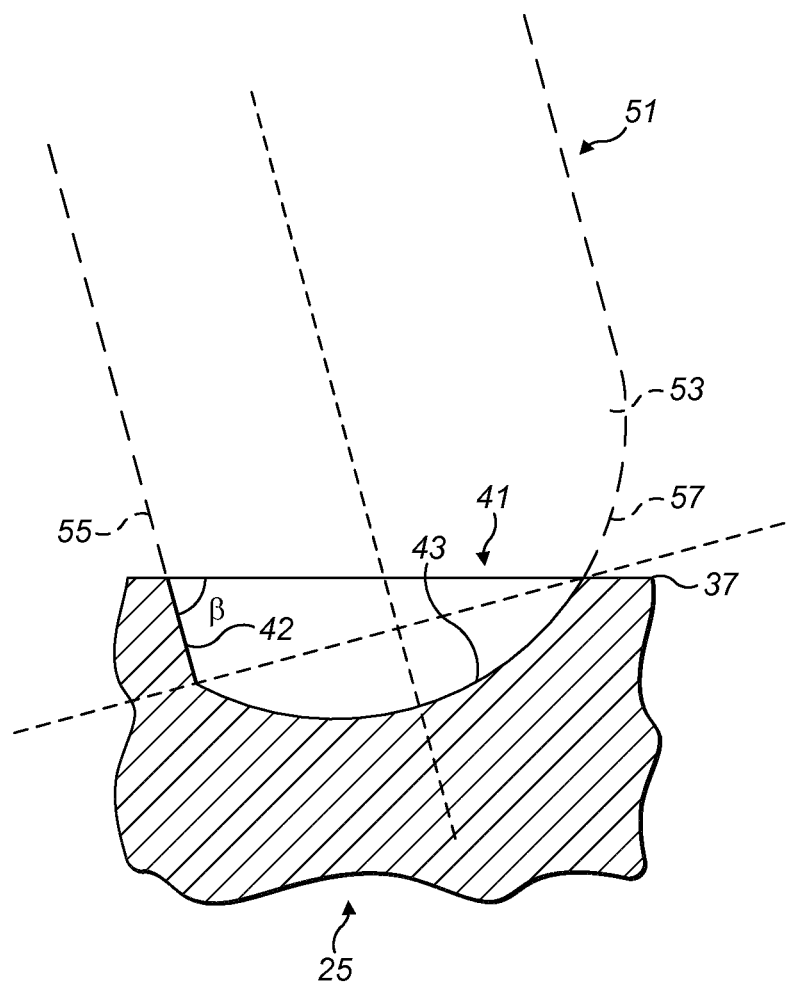
FIG. 2(c) illustrates a fragmentary vertical sectional view (along section I-I in FIG. 2(b)) of the diffractive element of FIG. 2(a) and a cutting tool in a cutting operation in accordance with an embodiment of the present invention.

FIG. 1 illustrates a microscope in accordance with a first embodiment of the present invention, in this embodiment a projection microscope.

The microscope comprises an objective lens 3 for producing a primary image in an image plane, here a primary image plane PIP, of an object at an object plane OP, in this embodiment as defined by an aperture stop 5.

In this embodiment the microscope further comprises a projection lens 7 which images the primary image of the objective lens 3 in an image plane, here a secondary image plane SIP, and produces an image of the aperture of the objective lens 3 at the ray vertex 9 of the projection lens 7.

The microscope further comprises a field lens arrangement 11, in this embodiment comprising a pair of field lenses 15, 17, for relaying the exit pupil to a viewing plane VP, such as to be viewable by an eye of an observer.

The microscope further comprises a diffractive element 25, in this embodiment a transmissive element, which is located at the secondary image plane SIP, here intermediate the field lenses 15, 17 of the field lens arrangement 11, and is effective to produce an array of exit pupils, each corresponding to an exit pupil which would be produced in the absence of the diffractive element 25.

Through suitable design, the diffractive element 25 can be configured to provide that the exit pupils in the array of exit pupils are spaced apart or in contact, and the configuration is chosen such that the array of exit pupils appears to the eye of the observer in effect as a single, continuous enlarged exit pupil.

In this embodiment, as illustrated in FIGS. 2(a) to (c), the diffractive element 25 comprises a principal surface 37 which has an array of diffractive units 39, each of which generates one of the exit pupils of the array of exit pupils. The profile and form of the individual diffractive units 39 determines the comparative light energy within each of the individual pupil images.

In this embodiment the surface 37 is on a substantially flat plane. In an alternative embodiment the surface 37 could be a part-spherical surface.

In this embodiment the diffractive units 39 each comprise a lenticule 41, which are effective to produce diffractive interference of light passing therethrough and generate a plurality of exit pupils which are displaced relative to one another in the form of an array of exit pupils, such as to be viewable as a single, continuous enlarged exit pupil.

In this embodiment the lenticules 41 each comprise an irregular feature which has a plurality of surfaces. In this embodiment the lenticules 41 have substantially a rectangular or square shape at the principal surface 37 of the diffractive element 25.

In this embodiment the lenticules 41 are formed on a radial spiral. In an alternative embodiment the lenticules 41 could be formed on concentric circles, which can be rotated about an axis which is off centre of the axis of the concentric circles, thereby avoiding the concentric pattern being observed.

In this embodiment the lenticules 41 are formed on a radial spiral at a radial spiral pitch of 60 μm, and pitched at 69.3 μm along the spiral. In other embodiments the radial spiral pitch could be from about 40 μm to about 120 μm. In other embodiments the pitch along the spiral could be from about 40 μm to about 120 μm.

In this embodiment the lenticules 41 have a radial width of 55 μm. In other embodiments the lenticules 41 could have a width of from about 30 μm to about 100 μm.

In this embodiment the lenticules 41 have an average radial length of 100 μm. In other embodiments the lenticules 41 could have a width of from about 30 μm to about 100 μm.

The lenticules 41 each include a first, rectilinear surface 42 which is tilted or inclined relative to the principal surface 37 of the diffractive element 25 and defines a lateral face.

In this embodiment the rectilinear surface 42 encloses an angle β of 80.27 degrees relative to the principal surface 37 of the diffractive element 25. In other embodiments the rectilinear surface 42 could enclose an angle β of from about 65 degrees to about 90 degrees relative to the principal surface 37 of the diffractive element 25.

In this embodiment the rectilinear surface 42 is an arcuate or curved surface, here an outwardly-facing, frusto-cylindrical or frusto-conical surface. In an alternative embodiment the rectilinear surface 42 could be an outwardly-facing, frusto-cylindrical or frusto-conical surface.

The lenticules 41 each include a second arcuate or curved surface 43 which extends from the rectilinear surface 42 to the principal surface 37 of the diffractive element 25.

In this embodiment the arcuate surface 43 is a concave surface. In another embodiment the arcuate surface 43 could be a convex surface.

In this embodiment the arcuate surface 43 has a radius of 1 mm. In other embodiments the arcuate surface 43 has a radius of from about 0.5 mm to about 5 mm, preferably from about 0.5 mm to about 2 mm, more preferably from about 0.5 mm to about 1.5 mm.

In this embodiment, as illustrated in FIG. 2(c), the lenticules 41 are formed by a cutting tool 51 which is passed over the surface of the diffractive element 25.

In this embodiment the tool 51 comprises a frustospherical tip 53, having a flat part 55 which cuts the rectilinear surface 42 of each of the lenticules 41 and a spherical surface part 57 which cuts a spherical radius of the arcuate surface 43 of each of the lenticules 31. In this embodiment the spherical surface part 57 has a radius of 1 mm, and the flat part 55 is set at 28.6 μm from the axis of the tool 51. In other embodiments the spherical surface part 57 has a radius of from about 0.5 mm to about 5 mm, preferably from about 0.5 mm to about 2 mm, more preferably from about 0.5 mm to about 1.5 mm.

With this configuration, the microscope provides a single, enlarged exit pupil having an effective size corresponding to the array of exit pupils, and the array of exit pupils have desired optical characteristics, particularly in providing for uniform energy distribution of a polychromatic image.

Figure 3:
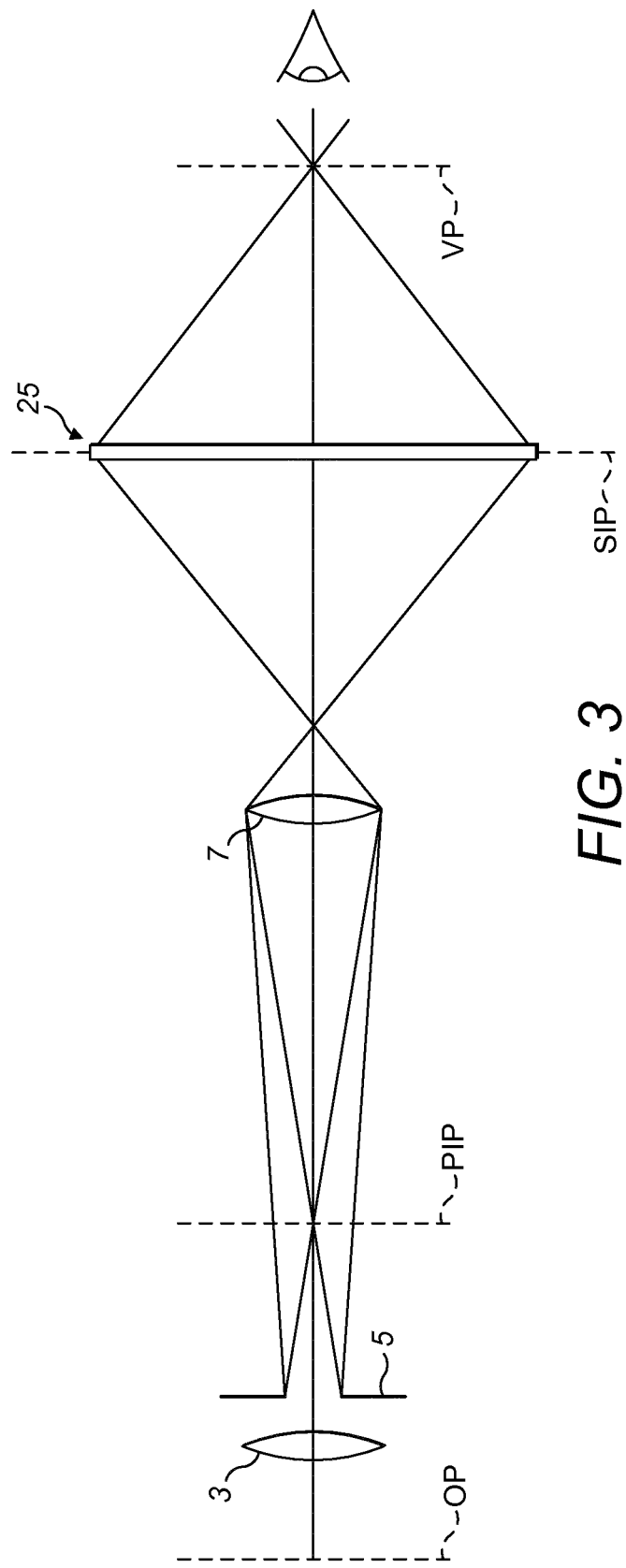
FIG. 3 illustrates an optical instrument in accordance with a second embodiment of the present invention.

FIG. 3 illustrates a microscope in accordance with a second embodiment of the present invention.

The microscope of this embodiment is similar to the microscope of the first-described embodiment, and thus, in order to avoid duplication of description, only the differences will be described in detail with like parts designating like reference signs.

The microscope of this embodiment differs from the first-described embodiment in that the field lens arrangement 11 is omitted, and instead the diffractive element 25 is configured to relay light from the received image to a common region on the viewing plane VP across the aperture of the diffractive element 25, in this embodiment centered on the optical axis of the diffractive element 25.

In this embodiment the diffractive units 39 which are disposed progressively radially outwardly from the optical axis of the diffractive element 25 are configured progressively to provide for an increasing angular offset, such that, independent of location on the diffractive element 25, light from the received image is relayed to a common region.

In this embodiment the progressively-increasing angular offset is provided by forming the lenticules 41 of the diffractive units 39 with increasing angular orientation relative to the optical axis of the diffractive element 25.

Figure 4:
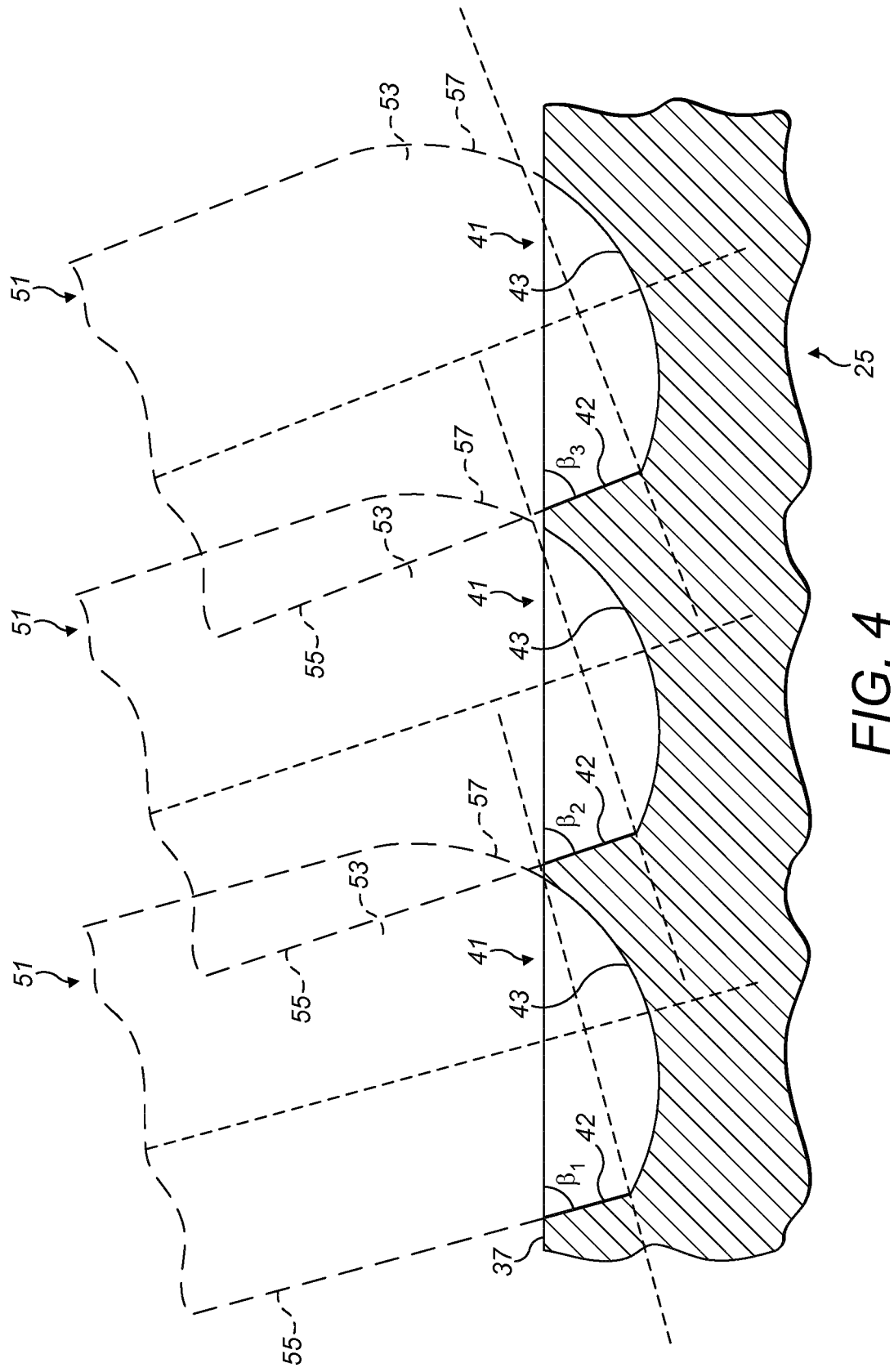
FIG. 4 illustrates a fragmentary vertical sectional view (along section I-I in FIG. 2(b)) of a diffractive element of the optical instrument of FIG. 3 and a cutting tool in a cutting operation in accordance with an embodiment of the present invention.

In this embodiment, as illustrated in FIG. 4, the lenticules 41 are formed by inclining the cutting tool 51 with increasing angular orientation $\beta_1, \beta_2, \beta_3, \ldots, \beta_n$ relative to the optical axis of the diffractive element 25 as the lenticules 41 are formed progressively radially outwardly from the optical axis of the diffractive element 25.

Finally, it will be understood that the present invention has been described in its preferred embodiments and can be modified in many different ways without departing from the scope of the invention as defined by the appended claims.

For example, in the described embodiments the diffractive element 25 is a transmissive element, but it will be understood that the diffractive element 25 could be provided as a reflective element.

The invention claimed is:

1. An optical instrument for producing an optical image to be viewed by an observer at a viewing plane, the optical instrument comprising:
   an optical system for producing an optical image of an object which is viewable by an observer at an exit pupil; and
   a diffractive element located at an image plane of the optical system for producing an array of the exit pupils, which are perceivable as a single, enlarged exit pupil by the observer;
   wherein the diffractive element comprises a surface which has an array of diffractive units, each of which generates one of the exit pupils of the array of exit pupils, the diffractive units each comprising a lenticule, which is effective to produce diffractive interference of light and generate a plurality of exit pupils which are displaced relative to one another in the form of an array of exit pupils, the lenticules each comprising an irregular feature having a plurality of surfaces;
   wherein the diffractive units are disposed progressively radially outwardly from the optical axis of the diffractive element and configured progressively to provide for an increasing angular offset, such that, independent of location on the aperture of the diffractive element and without any relay lens arrangement between the diffractive element and the viewing plane, light from the received image is relayed to a common region on the viewing plane across the aperture of the diffractive element.

2. The instrument of claim 1, wherein the lenticules are formed on a radial spiral.

3. The instrument of claim 2, wherein the lenticules are formed on a radial spiral at a radial spiral pitch of from about 40 μm to about 120 μm or from about 70 μm to about 100 μm and/or the pitch along the spiral is from about 40 μm to about 120 μm or from about 70 μm to about 100 μm.

4. The instrument of claim 1, wherein the lenticules each include a rectilinear lenticule surface which defines a lateral face and is tilted or inclined relative to the surface of the diffractive element.

5. The instrument of claim 4, wherein the lateral face encloses an angle of from about 65 degrees to about 90 degrees or from about 75 degrees to about 90 degrees relative to the surface of the diffractive element.

6. The instrument of claim 4, wherein the lateral face is an arcuate or curved surface.

7. The instrument of claim 6, wherein the lateral face is a frusto-cylindrical or frusto-conical surface.

8. The instrument of claim 6, wherein the lateral face is an outwardly-curved surface or an inwardly-curved surface.

9. The instrument of claim 4, wherein the lenticules each include a curved lenticule surface which extends from the rectilinear lenticule surface to the surface of the diffractive element.

10. The instrument of claim 9, wherein the curved lenticule surface is a concave surface or a convex surface.

11. The instrument of claim 9, wherein the curved lenticule surface has a radius of from about 0.5 mm to about 5 mm, from about 0.5 mm to about 2 mm or from about 0.5 mm to about 1.5 mm.

12. The instrument of claim 1, wherein the lenticules are formed by a cutting tool.

13. The instrument of claim 12, wherein the cutting tool comprises a frusto-spherical tip, having a flat part which cuts a rectilinear lenticule surface of each of the lenticules and a spherical part which cuts a spherical radius of the curved lenticule surface of each of the lenticules.

14. The instrument of claim 13, wherein the spherical part has a radius of from about 0.5 mm to about 5 mm, from about 0.5 mm to about 2 mm or from about 0.5 mm to about 1.5 mm.

15. The instrument of claim 1, wherein the progressively-increasing angular offset is provided by forming the lenticules of the diffractive units with increasing angular orientation relative to the optical axis of the diffractive element.

16. The instrument of claim 15, wherein the lenticules are formed by inclining a cutting tool with increasing angular orientation relative to the optical axis of the diffractive element as the lenticules are formed progressively radially outwardly from the optical axis of the diffractive element.

17. The instrument of claim 1, wherein the lenticules have a width of from about 30 μm to about 100 μm or from about 40 μm to about 70 μm.

18. The instrument of claim 1, wherein the lenticules have a length of from about 30 μm to about 100 μm or from about 50 μm to about 90 μm.

19. The instrument of claim 1, wherein the lenticules have substantially a rectangular shape at the surface of the diffractive element.

20. The instrument of claim 1, wherein the surface of the diffractive element is on a substantially flat plane.

21. The instrument of claim 1, wherein the optical instrument is a microscope.

* * * * *